US008040278B2

(12) United States Patent
Maltsev et al.

(10) Patent No.: US 8,040,278 B2
(45) Date of Patent: Oct. 18, 2011

(54) ADAPTIVE ANTENNA BEAMFORMING

(75) Inventors: Alexander Maltsev, Nizhny Novgorod (RU); Roman Maslennikov, Nizhny Novgorod (RU); Alexey Khoryaev, Dzerzhinsk (RU)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 12/215,842

(22) Filed: Jun. 30, 2008

(65) Prior Publication Data

US 2009/0121936 A1 May 14, 2009

Related U.S. Application Data

(60) Provisional application No. 60/986,778, filed on Nov. 9, 2007.

(51) Int. Cl.
*G01S 3/16* (2006.01)

(52) U.S. Cl. .................................... 342/378; 455/562.1

(58) Field of Classification Search .................. 342/377, 342/378; 455/63.4, 562.1; *G01S 3/16*
See application file for complete search history.

(56) References Cited

U.S. PATENT DOCUMENTS

| | | | | |
|---|---|---|---|---|
| 7,522,552 | B2 * | 4/2009 | Fein et al. | 370/328 |
| 7,545,778 | B2 * | 6/2009 | Sugar et al. | 370/335 |
| 7,653,163 | B2 * | 1/2010 | Sadri et al. | 375/349 |
| 7,822,141 | B2 * | 10/2010 | Wight | 375/267 |
| 2001/0049295 | A1 * | 12/2001 | Matsuoka et al. | 455/562 |
| 2004/0042427 | A1 * | 3/2004 | Hottinen | 370/335 |
| 2006/0194544 | A1 * | 8/2006 | Struckman | 455/67.11 |
| 2007/0157279 | A1 * | 7/2007 | Hara et al. | 725/124 |
| 2007/0205943 | A1 | 9/2007 | Nassiri-Toussi et al. | |
| 2007/0253476 | A1 * | 11/2007 | Tirkkonen et al. | 375/230 |
| 2008/0049709 | A1 * | 2/2008 | Pan et al. | 370/344 |

FOREIGN PATENT DOCUMENTS

WO WO 2006008565 A1 * 1/2006

OTHER PUBLICATIONS

Introduction to Probability Theory and Statistical Inference, 2nd edition, by Harold J. Larson, Publisher: John Wiley & Sons, 1974, section 5.2, pp. 176-185; pages cited in Office Action: pp. 181-182. Total Sheets: 7.*

* cited by examiner

*Primary Examiner* — Thomas Tarcza
*Assistant Examiner* — John Vigushin
(74) *Attorney, Agent, or Firm* — Trop, Pruner & Hu, P.C.

(57) ABSTRACT

Adaptive antenna beamforming may involve a maximum signal-to-noise ratio beamforming method, a correlation matrix based beamforming method, or a maximum ray beamforming method. The adaptive antenna beamforming may be used in a millimeter-wave wireless personal area network in one embodiment.

21 Claims, 2 Drawing Sheets

ADAPTIVE ANTENNA BEAMFORMING

CROSS-REFERENCE TO RELATED APPLICATIONS

This application claims priority to provisional application No. 60/986,778, filed Nov. 9, 2007, which application is fully incorporated by reference herein.

BACKGROUND

This relates generally to the field of wireless communications.

In most wireless communication systems, the air link consists of the propagation channel between one transmit antenna and one receive antenna. However, it has been established that using multiple antennas at the transmitter and receiver can significantly increase the link budget and, consequently, link capacity. The drawback of this approach is that the complexity of the system can also increase dramatically.

The increase in link budget or link capacity is achieved via various approaches, including increasing diversity, multiplexing, and beamforming. Beamforming generally involves a training phase in which the receiver learns information about how signals will ultimately be transmitted between the receiver and the transmitter. That information can be provided to the transmitter to appropriately form the beams for the particular communication environment that exists. The communication environment may include interfering stations, obstructions, and any other relevant criteria.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

The millimeter-wave (mmWave) wireless personal area networks (WPAN) communication systems, operating in the 60 GHz frequency band, are expected to provide several gigabits per second (Gbps) throughput to distances of about 10 m. Currently several standardization bodies (IEEE 802.15.3c, WirelessHD SIG, ECMA TG20) consider different concepts of the mmwave WPAN systems to define the systems which are the best suited for the multi-Gbps WPAN applications. While an embodiment is described herein that is suitable for mmwave WPAN, the present invention is not so limited.

The use of directional antennas is important for mmWave WPAN systems because high frequency (60 GHz) allows a miniature high-gain antenna implementation and high antenna gains are needed to maintain sufficient link budget for large signal bandwidth (~2 GHz) and limited transmission power.

The types of the antenna systems, which may be used for the mmWave WPANs, include:

1. phased antenna array where inputs and outputs to/from antenna elements can be multiplied by the weight (phase) vector to form transmit/receive beams;
2. sectorized antenna which can be switched to one of the several beams;
3. sectorized antenna where inputs/outputs to/from several sectors can be combined with some weights; and
4. non-switched directional or omni-directional antenna.

Devices with the beam steerable antennas (types 1-3) require the optimal adjustment of transmit and receiver antenna systems (beamforming) before the start of data transmission. For sectorized antennas (type 2) the beamforming consists of the best (for some criterion) transmit and receive sectors/beams selection. With the phased antenna arrays (type 1) and sectorized antenna where the sectors can be combined with some weights (type 2), the precise adjustment of the weights is done during the beamforming procedure (not just selection of the best sector) to achieve the maximum performance of the communication system.

Figure 1:
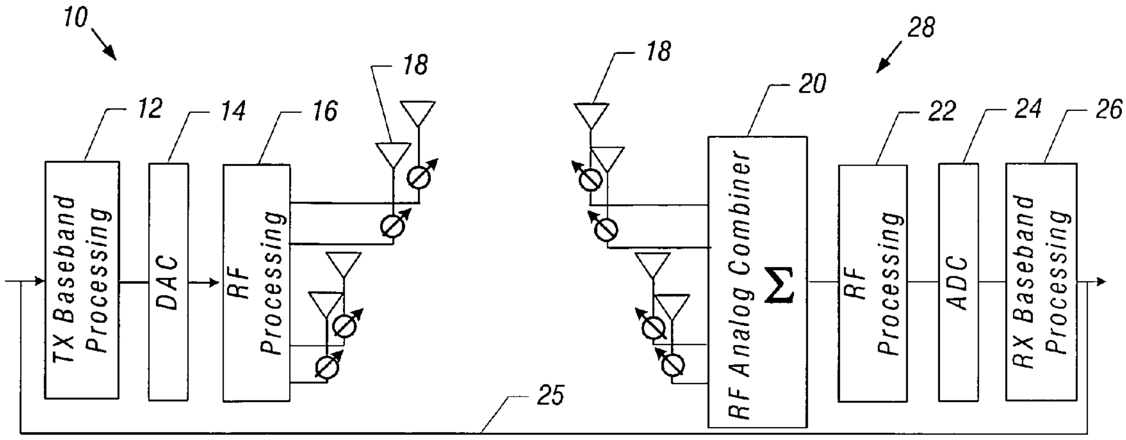
FIG. 1 is a system schematic for one embodiment.

Beamforming for 60 GHz communication systems may be implemented in the radio frequency spectrum to be able to have a large number of antenna elements to provide a highly directional antenna pattern. A block diagram of two communicating devices 10 and 28 is shown in FIG. 1. The transmitter 10 may include a transmit baseband processing section 12, a digital-to-analog converter 14, and a radio frequency processing section 16, coupled to beamforming antennas 18. While four beamforming antennas are depicted in FIG. 1, the number of beamforming antennas may vary considerably. The beamforming antennas may be phased antenna arrays, sectorized antennas that can be switched to one of several beams, a sectorized antenna where inputs and outputs to and from several sectors can be combined with some weights, or a directional antenna, to mention a few examples.

The receiver 28 includes the receiving antennas 18, radio frequency analog combiner 20, radio frequency processing section 22, analog-to-digital converter 24, and a received baseband processing section 26.

Radio frequency beamforming may use a single weight vector for the whole frequency selective channel instead of a unique weight vector for every subcarrier or small sets of subcarriers.

Figure 2:
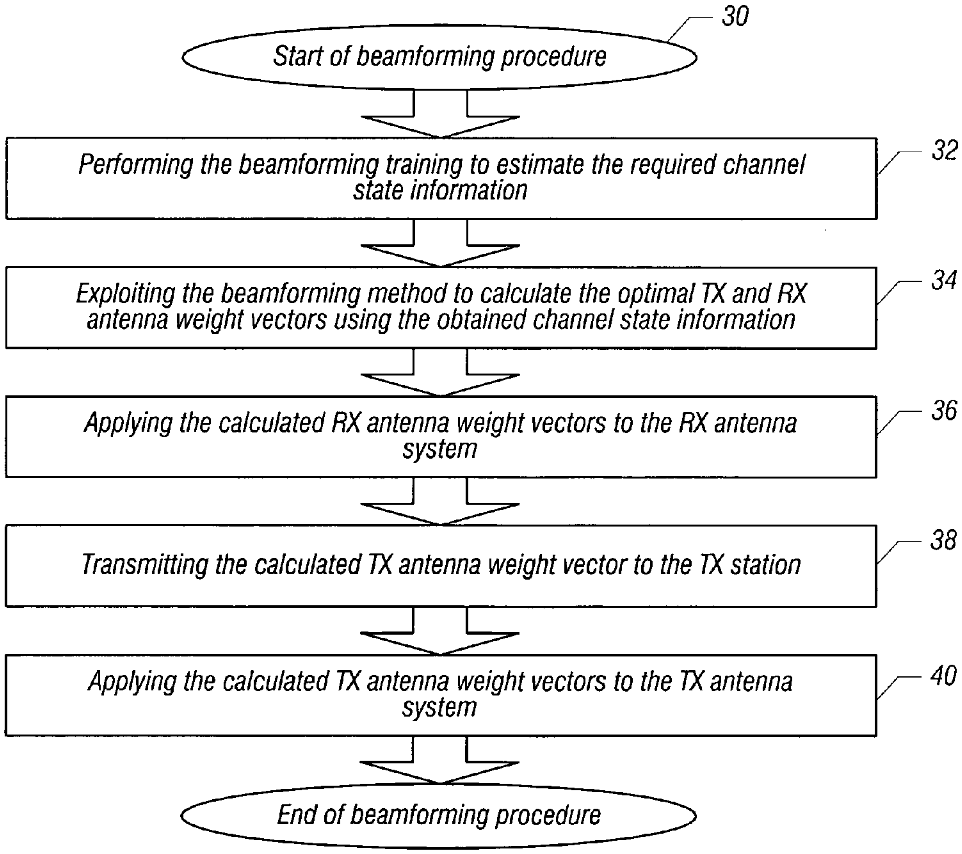
FIG. 2 is a flow chart for one embodiment.

Optimal beamforming settings may be acquired during the beamforming procedure, as shown in FIG. 2. The transmit station 10 transmits training signals (block 32) using the predetermined transmit antenna settings (changing over the time) while the receive station 28 performs the processing (block 34) of the received signals and is able to estimate the needed channel state information from the received signals.

The beamforming can be done during one or several stages where the receive station feeds back the control messages to the transmit station between stages on the parameters of the further training needed. After all the needed channel state information is obtained, the receive station calculates optimal transmit and receive antenna settings (i.e. best transmit/receive sectors for beam-switched sectorized antennas and optimal transmit and receive weight vectors for phased array antennas or antennas with sectors combining). Then the receive antenna weight vector is applied by the receive station (block 36) and the transmit antenna weight vector is sent to the transmit station using the feedback channel and, after that, is applied by the transmit station (block 38) and applied at the transmit station (block 40).

Alternatively, in the other embodiments, the receive antenna weight vector may be estimated at the receive station and the channel state information needed for the transmit antenna weight vector estimation may be sent to the transmit station and the transmit antenna weight vector calculation may be done at the transmit station.

A feedback channel 25 may exist between transmit and receive stations to exchange the control messages. Such feedback channel may be a low-rate channel where the high redundancy (e.g. spreading or repetition) is used so that it does not require precise beamforming but only some coarse beamforming is needed. Such coarse beamforming can be done prior to the precise beamforming for the high-rate mode. The other possibility for the low-rate feedback channel is to use out-of-band (OOB) transmission (e.g. 2.4 GHz or 5 GHz or other low frequency band) to exchange control messages about the beamforming.

Different methods can be exploited by the receive station to calculate optimal antenna weight vectors to be used during the high-rate data transmission.

Figure 3:
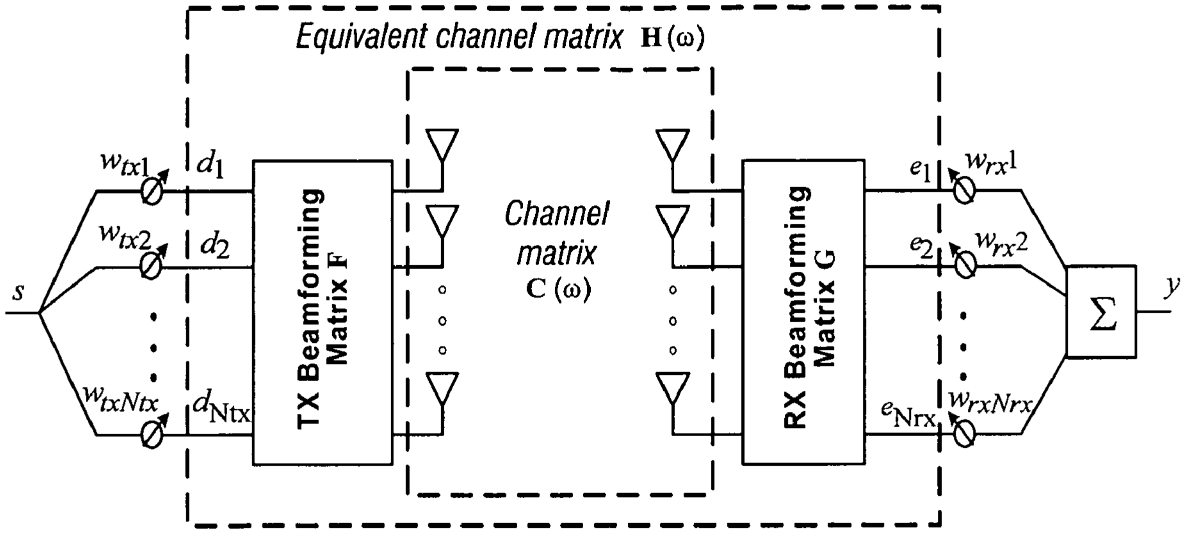
FIG. 3 is a system schematic for another embodiment.

To describe the beamforming method, it is convenient to introduce the mathematical model (in frequency domain) of the system shown in the FIG. 3.

The transmit and receive antenna elements can be considered to be connected through the frequency selective channel transfer matrix $C(\omega)$. The equivalent frequency selective channel matrix $H(\omega)$ may be introduced by applying frequency non-selective transmit beamforming matrix F at the transmit side and the receive beamforming matrix G at the receive side:

$$H(\omega)=G^H C(\omega)F$$

Thus the equivalent channel matrix $H(\omega)$ is defined between transmit antenna system inputs $d_i$ ($i=1, \ldots, N_{transmit}$) and the receive antenna system outputs $e_j$ ($j=1, \ldots, N_{receive}$). The transmit and receive antenna weight vectors $w_{transmit}$ and $w_{receive}$ are applied to the inputs of the transmit and the outputs of the receive antenna systems respectively to make the mutually adjusted beamforming.

The matrices F and G are composed of the vectors $f_1 \ldots f_{Ntransmit}$ and $g_1 \ldots g_{Nreceive}$ respectively where these vectors may be considered as elementary beams (or antenna patterns) which may be combined to create final transmit and receive antenna patterns. The transmit beamforming matrix may not be known to the receive and also receive beamforming matrix may not be known to the transmit to perform the beamforming. The general approach of using beamforming matrices allows application of the arbitrary beamforming basis (e.g. Butler, Hadamard, identity and other) for the adaptive antenna beamforming.

The sectorized antenna systems with the single sector selection and sectorized antenna system with sectors combining may be considered as special cases of the suggested mathematical model. For these cases the beamforming matrices F and G are identity matrices but every antenna element has its own antenna pattern (beam) which may be mathematically taken into account by its inclusion into the $H(\omega)$ matrix. Also for the simple switched sectorized antenna only beamforming vectors $w_{transmit}$ and $w_{receive}$ with one element equal to one and other elements equal to zero may be used.

Using the given mathematical model the received signal $y_f(k)$ for the k-th subcarrier of the orthogonal frequency division multiplexed (OFDM) system exploiting the frequency domain processing can be written as a multiplication of the signal $s_f(k)$ transmitted at the k-th subcarrier, transmit antenna weight vector $w_{transmit}$, frequency domain channel transfer matrix at the k-th subcarrier $H_f(k)$ and the receive antenna weight vector $w_{receive}$:

$$y_f(k)=w_{rx}^H H_f(k) w_{tx} s_f(k)$$

where $w_{rx}^H$ Hermitian transpose of $W_{rx}$. The subcarrier index k takes all the values from 1 to the number of the active subcarriers $N_{Sc}$.

The equivalent mathematical expressions may be obtained for the single carrier system and time domain processing. The received signal at the n-th time moment $y_t(n)$ may be written as a convolutional of the transmitted signal $s(n-k)$ and the channel matrix time domain impulse response characteristic $H_t(k)$ multiplied by the transmit and receive antenna weight vectors $w_{tx}$, and $w_{rx}$:

$$y_t(n)=\sum_{k=1}^{N_D} w_{rx}^H H_t(k) w_{tx} s_t(n-k)$$

where the $N_D$ is the index for the largest channel delay.

A beamforming training algorithm provides the information about the frequency dependent (or equivalently time dependent) channel matrix structure (channel state information). As seen from the mathematical model description of the considered system, the channel state information may include:

1. the set of the channel matrices (estimates) for every active subcarrier—$H_f(1), \ldots, H_f(N_{Sc})$ for the OFDM system and frequency domain processing or
2. the channel matrix impulse response characteristic $H_t(1) \ldots H_t(N_D)$ for the single carrier system and time domain processing.

Such information may be provided by the training and signal processing algorithms to apply the beamforming method for transmit and receive antenna weight vectors calculation. For some cases, the channel state information may be estimated, not for all, but just for a subset of the transmit antenna system inputs and receive antenna system outputs (elementary transmit and receive beams) based on the a priori knowledge or some other factors or limitations. In this case, the beamforming is done to find the weight vectors to optimally combine these available transmit and receive beams only.

Also, the beamforming method may involve knowledge of the channel transfer matrix, not for all, but for a subset of the active subcarriers. Equivalently in the case of the time domain signal processing the knowledge of the channel matrix impulse response characteristic may be needed not up to the maximum delay index but for some subset of the delay indices—e.g. for the most powerful rays only. In these cases the estimation of the channel state information may be done by the beamforming training procedure for the needed subcarriers or rays only.

After the needed channel state information is available, beamforming methods may be used to calculate the transmit and receive antenna weight vectors to be applied for the data transmission.

The optimal maximum signal-to-noise ratio (SNR) beamforming method provides the transmit and receive antenna weight vectors for the maximization of the total (calculated over the full channel bandwidth) signal-to-noise ratio and can be applied for the frequency domain (OFDM system) or time-domain (single carrier system) processing.

For the frequency domain processing, the maximum SNR beamforming method calculates the transmit antenna weight vector $w_{transmit}$ to maximize the eigen value $\lambda_1$ of received signal correlation matrix $R_{receive}$ (correlation between different receive antenna system outputs or receive beams) averaged over some or all the active subcarriers:

$$R_{rx} = \sum_{k=1}^{N_{Sc}} (H_f(k) w_{tx} w_{tx}^H H_f^H(k))$$

where $H_f^H$ (K) is the Hermitian transpose of $H_f(k)$

After that the receive antenna weight vector is found as an eigen vector $v_{rx1}$ corresponding to the maximum eigen value $\lambda_1$ of the averaged correlation matrix $R_{rx}$:

$$R_{rx} v_{rx1} = \lambda_{rx1} \; w_{rx} = v_{rx1}$$

Equivalently, this method may be formulated to find the receive antenna weight vector $w_{tx}$ which maximizes the largest eigen value $\lambda_1$ of transmit signal correlation matrix $R_{tx}$ (correlation between different transmit antenna system inputs or transmit beams) averaged over some or all the active subcarriers:

$$R_{tx} = \sum_{k=1}^{N_{Sc}} (H_f^H(k) w_{rx} w_{rx}^H H_f(k))$$

Then, the transmit antenna weight vector may be found as an eigen vector $v_{tx1}$ corresponding to the maximum eigen value $\lambda_1$ of the averaged correlation matrix $R_{tx}$:

$$R_{tx} v_{tx1} = \lambda_1 v_{tx1} \; w_{tx} = v_{tx1}$$

Equivalently, for the time domain processing, the maximum SNR beamforming is implemented by the same method as for the frequency domain processing except that the correlation matrices $R_{rx}$ and $R_{tx}$ are found by averaging of the channel matrix impulse response characteristics over the different delay indices:

$$R_{rx} = \sum_{k=1}^{N_D} (H_t(k) w_{tx} w_{tx}^H H_t^H(k))$$

$$R_{tx} = \sum_{k=1}^{N_D} (H_t^H(k) w_{rx} w_{rx}^H H_t(k))$$

Not all the elementary transmit and receive beams (transmit antenna system inputs and receive antenna system outputs) may be considered for the beamforming methods. In the case of the reduced number of the elementary transmit and receive beams, the dimensionality of the channel matrices H is effectively reduced and the optimal beamforming is done by combining the efficient transmit and receive beams only. Also not all the subcarriers and delay indices may be taken into account in the maximum SNR beamforming method but only some subset of the subcarriers and delay indices (rays) to reduce the computational requirements of the method without significant degradation of the beamforming performance.

For some scenarios, the maximum SNR algorithm may not likely be implemented due to computational complexity of the needed optimization procedure. In this case, a correlation matrix based beamforming method may be used to calculate transmit and receive antenna weight vectors.

In this method, for the frequency domain processing, the receive correlation matrix $R_{rx}$ is found by averaging (over some or all active subcarriers) of the multiplication of the channel transfer matrix for the k-th subcarrier $H_f(k)$ by the same Hermitian transposed channel transfer matrix for the k-th subcarrier $H_f^H(k)$. Then, the receive antenna weight vector $w_{rx}$ is found as the eigen vector $v_{rx1}$ corresponding to the largest eigen value $\lambda_{rx1}$ of the correlation matrix $R_{rx}$:

$$R_{rx} = \sum_{k=1}^{N_{Sc}} (H_f(k) H_f^H(k))$$

$$R_{rx} v_{rx1} = \lambda_{rx1} v_{rx1}$$

$$w_{rx} = v_{rx1}$$

The transmit correlation matrix $R_{tx}$ is found by averaging (over some or all active subcarriers) of the multiplication of the Hermitian transposed channel transfer matrix for the k-th subcarrier $H_f^H(k)$ by the channel transfer matrix for the k-th subcarrier $H_f(k)$. Then, the transmit antenna weight vector $W_{tx}$ is found as the eigen vector $v_{tx1}$ corresponding to the largest eigen value $\lambda_{tx1}$ of the correlation matrix $R_{tx}$:

$$R_{tx} = \sum_{k=1}^{N_{Sc}} (H_f^H(k) H_f(k))$$

$$R_{tx} v_{tx1} = \lambda_{tx1} v_{tx1}$$

$$w_{tx} = v_{tx1}$$

For the time domain processing, the correlation matrix based beamforming is implemented by the same method as for the frequency domain processing except that the correlation matrices $R_{rx}$ and $R_{tx}$ are found by averaging of the channel matrix impulse response characteristics over the different delay indices:

$$R_{rx} = \sum_{k=1}^{N_D} (H_t(k) H_t^H(k))$$

$$R_{tx} = \sum_{k=1}^{N_D} (H_t^H(k) H_t(k))$$

For many practical cases, the performance of the correlation matrix-based algorithm is close to the performance of the optimal maximum SNR algorithm. But the computational complexity of the correlation matrix based algorithm may be significantly below that of the maximum SNR algorithm.

Also, as for the maximum SNR method, not all the elementary transmit and receive beams (transmit antenna system inputs and receive antenna system outputs) may be considered for the beamforming procedure. In this case the dimensionality of the channel matrices H is effectively reduced and the optimal beamforming is done by combining the available transmit and receive beams. Also not all the subcarriers and delay indices (rays) may be considered in the correlation matrix-based beamforming method but only some subset of the subcarriers and delay indices to reduce the computational requirements of the method without significant degradation of the beamforming performance.

Figure 4:
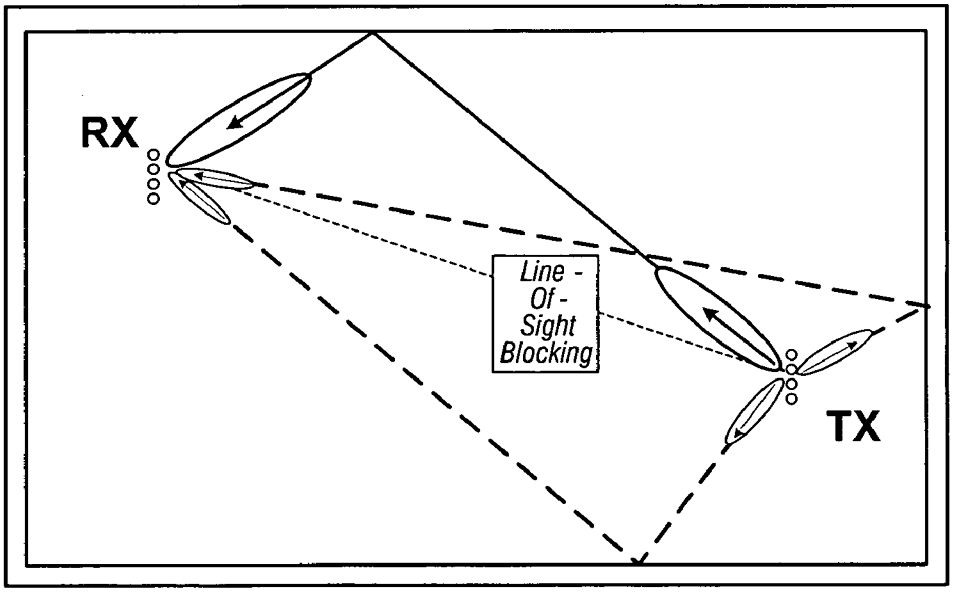
FIG. 4 is a block diagram of one embodiment of a system propagation channel including several geometric rays.

The propagation channel for the 60 GHz wireless systems is known to have a quasi-optical nature so that a geometrical optics model is quite accurate for signal propagation description. In this case, the transmitted and received signal can be considered to consist of the multiple rays, as shown in FIG. 4, and the beamforming method may be defined to find the transmit and receive antenna weight vectors to communicate through the best ray with the maximum power.

The maximum ray beamforming method may be as follows. The propagation channel for the communication system can consist of the several rays propagating between transmit (TX) and receive (RX) stations. There is a high probability that different rays have different propagation distances and thus have different times-of-arrival and thus can be distinguished by the receive station in the time-domain. The exploited sample rate is high—about 2 GHz which corresponds to about 0.5 ns (time) or 0.15 m (distance) resolution. So it is assumed that every sample $H_t(k)$ of the channel matrix impulse response characteristic $H_t(1), \ldots, H_t(N_D)$ (obtained during the training procedure) includes only one ray or no rays at all. So the channel matrix sample $H_t(k_{MAX})$ may be found which corresponds to the most powerful ray and after that the singular-value-decomposition (SVD) of the $H_t(k_{MAX})$ is done. The optimal transmit and receive antenna weight vectors $w_{tx}$ and $w_{rx}$ may be defined as SVD decomposition vectors $v_1$ and $u_1$ corresponding to the maximum singular value $\sigma_1$:

$$H_t(k_{MAX}) = \sum_{i=1}^{max(N_{tx},N_{rx})} \sigma_i u_i v_i^H$$

$$w_{tx} = v_1$$

$$w_{rx} = u_1$$

In order to define the optimal channel matrix impulse response sample $H_t(k_{MAX})$ mentioned above, several procedures may be used. The optimal procedure is to compare the maximum singular values $\sigma_1(1), \ldots, \sigma_1(N_D)$ of the channel matrix impulse response samples $H_t(1), \ldots, H_t(N_D)$ and then select the $k_{MAX}$-th sample corresponding to the largest singular value $\sigma_1$ $(k_{MAX})$. Such method is optimal in the sense that it selects the ray with the maximum SNR, but is computationally rather complex as the SVD has to be done for every time delay index k, k=1, . . . , $N_D$.

Other procedures which may be used for the optimal channel matrix sample $H_t(k_{MAX})$ identification are the Frobenius norm or the maximum element criteria. The Frobenius norm is defined as a square root of a sum of the squared modules of all matrix elements and it is also equal to the square root of the sum of the squared singular values of the matrix:

$$\|H_t(k)\|_F = \sqrt{\sum_{i=1}^{N_{rx}} \sum_{j=1}^{N_{tx}} |h_{ij}(k)|^2} = \sqrt{\sum_{i=1}^{max(N_{tx},N_{rx})} \sigma_i^2(k)}$$

So if the channel matrix sample $H_t(k)$ corresponds to the single ray then it has the only one non-zero singular value and the Frobenius norm becomes equal to the maximum singular value. The Frobenius norm is computationally much simpler to evaluate than to calculate SVD of the matrix and so it can be used for the best channel matrix sample $H_t(k)$ selection.

Another procedure which may be applied is the selection of the matrix with the maximum element $|h_{ij}(k)|_{max}$. It is known that the absolute value of the maximum element of the matrix is less than or equal to the largest singular value of this matrix:

$$|h_{ij}(k)|_{max} \leqq \sigma_1(k)$$

So the matrix $H_t(k_{MAX})$ may be selected as the matrix with the largest element. Also a combination of the Frobenius norm or the maximum element criteria may be used. It should be noted that the performance of the maximum ray beamforming method is close to the optimal performance for many practical scenarios.

For other radio frequency beamforming methods, the final transmit and receive antenna patterns may be a combination of the several geometrical rays. But the maximum ray beamforming method has an advantage in terms of the frequency-selectivity of the resulting frequency domain channel transfer function in some embodiments. As the beamforming is done for the single received ray the frequency domain characteristics of the resulting communication channel is almost flat.

The maximum ray beamforming method requires knowledge of the channel impulse response matrix in the time domain. So it is natural to apply this method with the time-domain single carrier systems. But the method may be applied with the frequency-domain OFDM systems as well, by performing the beamforming training of the system in the time-domain and alternatively by estimating the time-domain channel impulse response matrix from the frequency domain data.

The beamforming methods described so far may provide unquantized transmit and receive antenna weight vectors but the transmit and receive antenna systems may have limitations on the continuity of the magnitude and phase of the weight vectors coefficients to be applied. In this case the quantization of the antenna weight vectors is done to the closest allowable value.

Also the transmit and receive antenna weight vectors may be quantized to reduce the amount of the data to be transferred for antenna weight vectors transmission between stations after they are calculated. In this case the quantization of the antenna weights is done to the nearest point.

The quality of the beam-formed transmission may become worse during the data transmission due to non-stationary environment and therefore the beam tracking procedure may be used to adjust the transmit and receive antenna weight vectors without starting the whole initial beamforming procedure described above.

For the beam tracking procedure, the antenna training may be done to update the transmit and receive antenna beams close to the current beamforming and the antenna weight vectors are updated using the recursive procedures which may be obtained for all the considered beamforming algorithms and taking the current transmit and receive antenna weight vectors as an initial values.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

beamforming by calculating antenna weight vectors to maximize a total signal to noise ratio;

calculating a transmit antenna weight vector to maximize the eigen value of a received signal correlation matrix, where the received signal correlation matrix is calculated by averaging of per subcarrier received signal correlation matrices over all active subcarriers and the receive antenna weight vector is calculated as an eigen vector corresponding to the largest eigen value of the averaged correlation matrix;

calculating the averaged correlation matrix over less than all the active subcarriers and then maximizing its largest eigen value by selecting a transmit antenna weight vector and selecting a receive antenna weight as an eigen vector corresponding to the largest eigen value of this correlation matrix; and applying the antenna weight vectors to at least one of a receiving or transmitting antenna system.

2. The method of claim 1 including using beamforming in a millimeter-wave wireless personal area network.

3. The method of claim 1 including using as said antenna system one of a phased antenna array, a sectorized antenna, or a directional antenna.

4. The method of claim 1 including using beamforming training to estimate channel state information.

5. The method of claim 1 including applying the calculated weight vectors to the receiving antenna system.

6. The method of claim 5 including transmitting the calculated transmit antenna weight vectors to a transmit station.

7. The method of claim 1 including calculating said antenna weight vectors over the full channel bandwidth.

8. The method of claim 1 including calculating said weight vectors in the frequency domain.

9. The method of claim 1 including calculating said weight vectors in the time domain.

10. The method of claim 1 including calculating a receive antenna weight vector to maximize an eigen value of a transmitted signal correlation matrix, where the transmitted signal correlation matrix is calculated by averaging of the per subcarrier transmitted signal correlation matrices over all active subcarriers and a transmit antenna weight vector is calculated as an eigen vector corresponding to the largest eigen value of this correlation matrix.

11. The method of claim 10 including calculating the averaged correlation matrix over less than all active subcarriers and then maximizing its largest eigen value by selecting the receive antenna weight vector and selecting the transmit antenna weight vector as an eigen vector corresponding to the largest eigen value of this correlation matrix.

12. The method of claim 11 wherein calculating the averaged correlation matrix is done in the time domain by averaging over correlation matrices for different delay indices rather than in the frequency domain by averaging over the active subcarriers indices.

13. A wireless communication apparatus comprising:

a processor to determine a correlation matrix by averaging over a number of subcarriers, the multiplication of Hermitian transpose channel transfer matrix by the channel transfer matrix, said processor to determine an antenna weight vector as an eigen vector having the largest eigen value of the matrix, said processor to determine both a receive and a transmit signal correlation matrix and selecting a transmit antenna weight vector as an eigen vector corresponding to the largest eigen value of the transmit correlation matrix and selecting a receive antenna weight vector as the eigen vector corresponding to the largest eigen value of the receive correlation matrix; and an adjustable antenna system coupled to said processor.

14. The apparatus of claim 13 including determining said correlation matrix in the frequency domain.

15. The apparatus of claim 13 including determining the correlation matrix in the time domain.

16. A method comprising:

beamforming by finding a channel matrix impulse response sample that corresponds to a most powerful ray;

using singular-value-decomposition of the channel matrix sample to find the singular-value-decomposition vectors corresponding to a maximum singular value and selecting transmit and receive antenna weight vectors as singular value decomposition vectors corresponding to the maximum singular value; and determining the channel matrix impulse response sample using the Frobenius norm and selecting channel matrix impulse response sample with the maximum Frobenius norm.

17. The method of claim 16 including determining the channel matrix impulse response by comparing maximum singular values of channel matrix impulse response samples and selecting a sample corresponding to the largest singular value.

18. The method of claim 16 including determining the channel matrix impulse response sample using maximum element criteria by comparing the maximum absolute values of single element of each channel matrix impulse response sample and selecting channel matrix impulse response sample with the maximum value of the single element.

19. A method comprising:

beamforming by finding a channel matrix impulse response sample that corresponds to a most powerful ray;

using singular-value-decomposition of the channel matrix sample to find the singular-value-decomposition vectors corresponding to a maximum singular value and selecting transmit and receive antenna weight vectors as singular value decomposition vectors corresponding to the maximum singular value; and determining the channel matrix impulse response sample using maximum element criteria by comparing the maximum absolute values of single element of each channel matrix impulse response sample and selecting channel matrix impulse response sample with the maximum value of the single element.

20. A method comprising:

beamforming by calculating antenna weight vectors to maximize a total signal to noise ratio;

calculating a receive antenna weight vector to maximize an eigen value of a transmitted signal correlation matrix, where the transmitted signal correlation matrix is calculated by averaging of the per subcarrier transmitted signal correlation matrices over all active subcarriers and a transmit antenna weight vector is calculated as an eigen vector corresponding to the largest eigen value of this correlation matrix;

calculating the averaged correlation matrix over less than all active subcarriers and then maximizing its largest eigen value by selecting the receive antenna weight vector and selecting the transmit antenna weight vector as an eigen vector corresponding to the largest eigen value of this correlation matrix; and applying the antenna weight vectors to at least one of a receiving or transmitting antenna system.

21. The method of claim 20 wherein calculating the averaged correlation matrix is done in the time domain by averaging over correlation matrices for different delay indices rather than in the frequency domain by averaging over the active subcarriers indices.

* * * * *